(12) United States Patent
Itakura et al.

(10) Patent No.: US 6,540,545 B1
(45) Date of Patent: Apr. 1, 2003

(54) PORTABLE TOOL MOTOR HOUSING WITH INTEGRAL MOUNT FOR ELECTRIC COMPONENTS

(75) Inventors: Toru Itakura, Okazaki (JP); Fumitoshi Numata, Nagoya (JP)

(73) Assignee: Makita Corporation, Aichi-ken (JP)

( * ) Notice: Subject to any disclaimer, the term of this patent is extended or adjusted under 35 U.S.C. 154(b) by 246 days.

(21) Appl. No.: 09/685,746

(22) Filed: Oct. 11, 2000

(30) Foreign Application Priority Data

Oct. 12, 1999 (JP) .......................................... 11-289282

(51) Int. Cl.⁷ ................................................. H02K 7/14
(52) U.S. Cl. ......................................... 439/455; 310/50
(58) Field of Search ......................... 200/332.2; 310/47, 310/50; 439/455, 568

(56) References Cited

U.S. PATENT DOCUMENTS 3,757,194 A * 9/1973 Weber et al.
5,170,851 A  12/1992 Kress et al. ................... 173/29

FOREIGN PATENT DOCUMENTS

DE    28 24 384 C2    12/1984
DE    41 29 720 A1    3/1993
DE    198 10 873 A1    11/1998

* cited by examiner

*Primary Examiner*—Neil Abrams
(74) *Attorney, Agent, or Firm*—Davis & Bujold, P.L.L.C.

(57) ABSTRACT

A portable electric tool which miniaturizes a mold of a motor housing, reduces the costs for manufacturing the mold, extends the life of the mold, and simplifies attachment of electric equipment to a mount part of the motor housing. A flat mount part (29) extends toward the rear end of an electric tool is provided in the rear of the motor housing (5) and V-grooves (31) are provided on lateral sides of the mount part. Electric equipment to be attached to the electric too, such as a switch block (37) and a controller (39), are mounted to the top and bottom surfaces of the mount, respectively. On the bottom surface or the top surface of the electric equipment facing the surface of the mount part, engaging claws (41, 43) are provided which engages the V-grooves on the mount part. The electric equipment is attached to the mount part, by sliding forward from behind with the claws riding along the V-grooves. A rear cover (11) is added to retain the equipment.

3 Claims, 8 Drawing Sheets

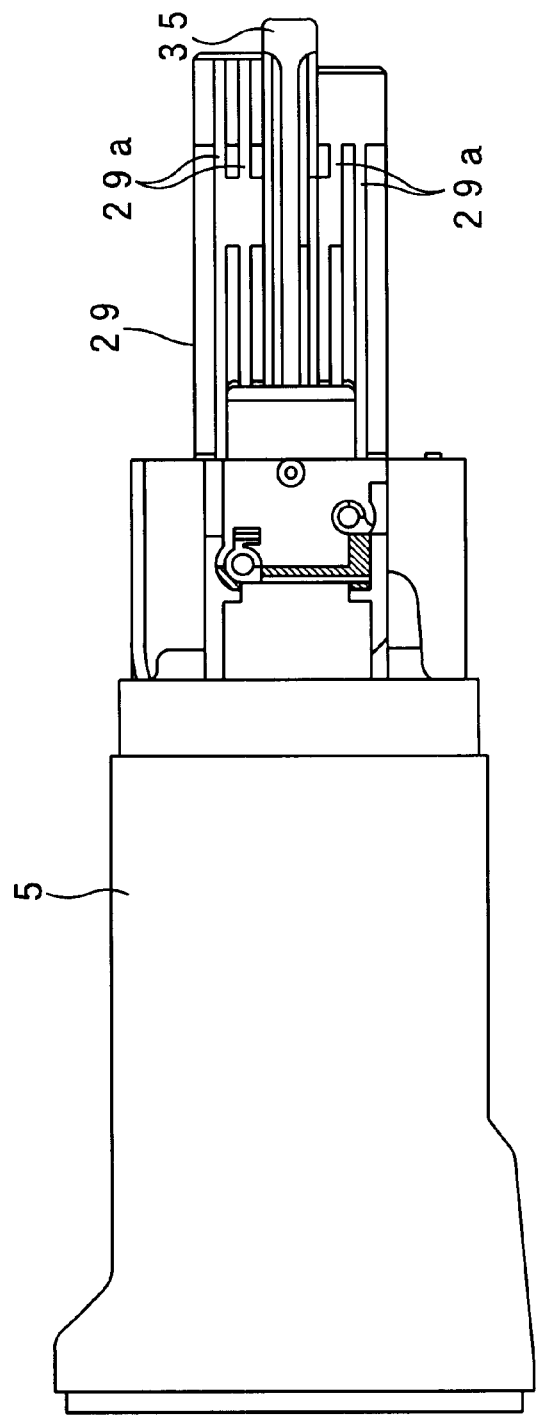

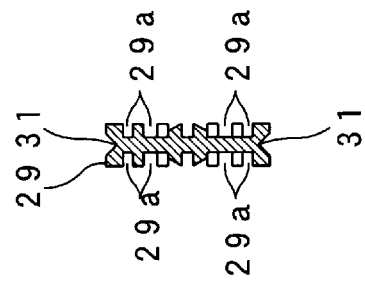
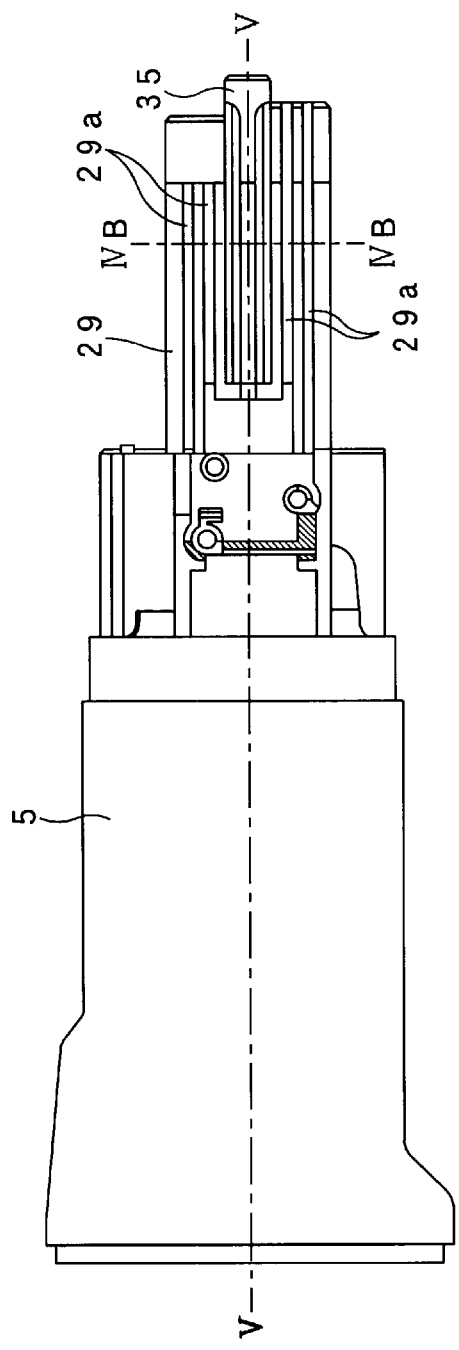
FIG. 4B
FIG. 4A

PORTABLE TOOL MOTOR HOUSING WITH INTEGRAL MOUNT FOR ELECTRIC COMPONENTS

FIELD OF THE INVENTION

This invention relates to an attachment structure for electric equipment in a portable electric tool.

BACKGROUND OF THE INVENTION

In a conventional portable electric tool, electric equipment such as a switch part and a speed controller is housed in a rear cover which is attached to the back of a motor housing. A mount part to which the electric equipment is attached is usually provided in the back of the motor housing.

In the conventional portable electric tool, however, a shape of the mount part on which the electric equipment is fixed is so complicated that a structure of a mold for manufacturing the mount part is also complicated. Consequently, the size of the mold becomes relatively large and the lifetime of the mold gets shortened. Additionally, in the conventional portable electric tool, it has been troublesome to attach the electric equipment to the mount part.

SUMMARY OF THE INVENTION

An object of the present invention is, in a portable electric tool, by simplifying a shape of a mold of a motor housing, to miniaturize the mold, to reduce costs for manufacturing the mold, to extend the lifetime of the mold and to simplify attachment of electric equipment to a mount part of the motor housing.

In order to attain the above object, an attachment structure for electric equipment in a portable electric tool according to the present invention features in that a mount part extending toward the rear end of the electric tool is provided in the back of a motor housing, at least on one side of the mount part provided with a concave groove for engagement with the electric equipment, the electric equipment to be attached to the electric tool is unitized, an engaging claw which engages the concave groove of the mount part is provided on the electric equipment, and the electric equipment is attached to the mount part, by sliding itself forward from behind, engaging its engaging claw with the concave groove.

In accordance with the attachment structure for electric equipment in a portable electric tool of the present invention, attachment of the electric equipment can be achieved by sliding the electric equipment forward from behind, engaging its engaging claw with the concave groove provided on the mount part. This structure makes it possible to simplify a shape of the mount part, and thus, to simplify a shape of the mold of the motor housing, miniaturize the mold (i.e. the mount part) and extend the lifetime of the mold. Furthermore, because of the simplicity of the shape of the mold, the attachment of the electric equipment can also be simplified.

In the attachment structure for electric equipment in a portable electric tool of the invention, it is preferred that the mount part is formed as a flat board with its top and bottom surface flattened, the concave groove is provided at least on either lateral side of the mount part, the electric equipment is unitized with its bottom or top surface flattened, and the engaging claw is provided on the bottom or top surface of the electric equipment.

With the application of such structure, the shape of the mount part is simplified and the shape of the mold is also simplified, and it becomes possible to miniaturize the mold. In this case, the lifetime of the mold can also be extended.

In the attachment structure for electric equipment in a portable electric tool of the invention, the electric equipment attached to the mount part is preferably fixed and firmly held by the motor housing and a rear cover which is attached from the back of the motor housing.

With the application of such structure, it is no longer necessary to screw the electric equipment on the mount part when attaching and fixing the electric equipment. Also, because the electric equipment is fixed and firmly held by the motor housing and the rear cover, the electric equipment is easily attached and fixed to the flat mount part as described above. Consequently, such structure enables the mount part to be flat enough to further simplify the shape of the mold, and also simplifies assembly of the portable electric tool.

Moreover, in the above attachment structure for electric equipment in a portable electric tool, a plurality of recesses extending in the axial direction are preferably formed on the top surface and the bottom surface of the mount part.

The application of such structure ensures weight reduction of the motor housing including the mount part.

BRIEF DESCRIPTION OF THE DRAWING FIGURES

The invention will now be described, by way of example, with reference to the accompanying drawings, in which:

FIG. 3 is a plan view of the motor housing of the portable disc grinder according to the embodiment;

FIG. 4A is a bottom view of the motor housing of the portable disc grinder according to the embodiment;

FIG. 4B is a sectional view taken along the line IV B—IV B in FIG. 4A;

DETAILED DESCRIPTION OF THE PREFERRED EMBODIMENT

Figure 1:
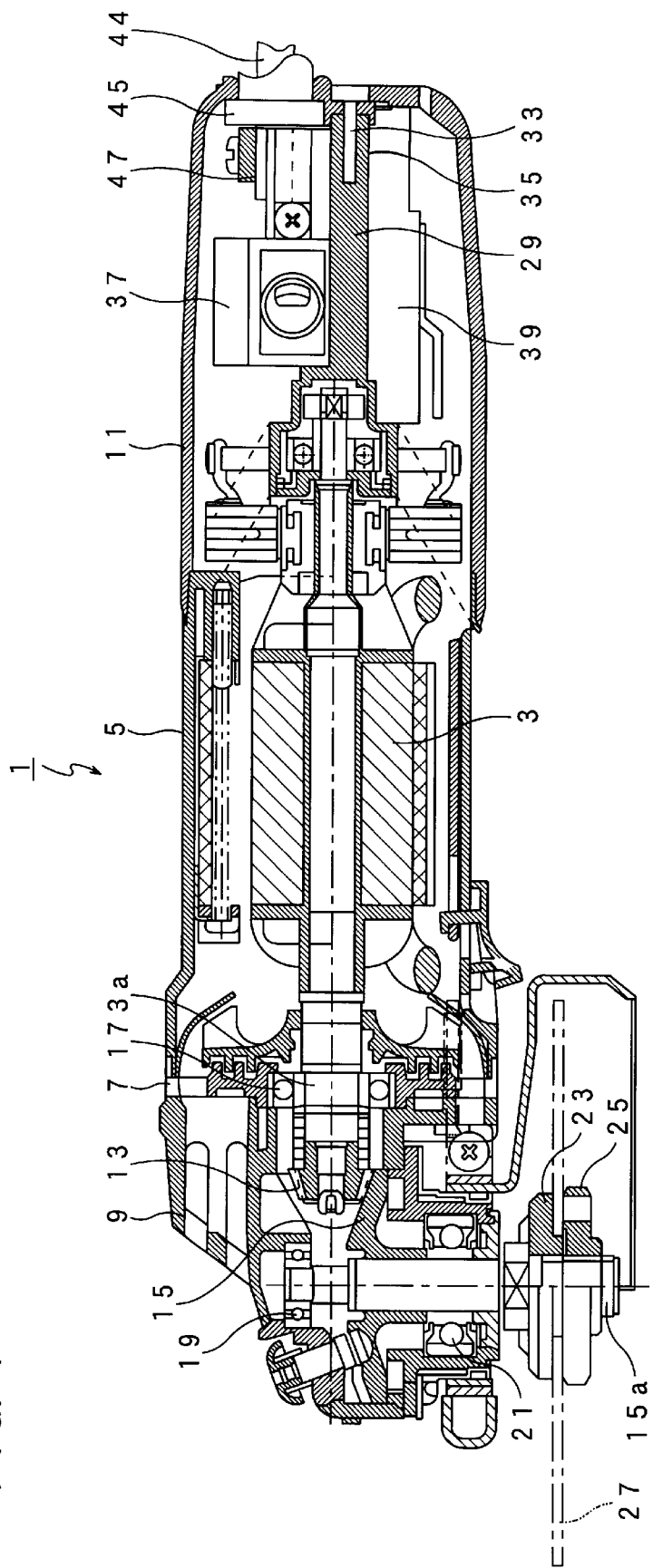
FIG. 1 is a sectional view illustrating an internal structure of a portable disc grinder according to an embodiment of the invention.
Figure 2:
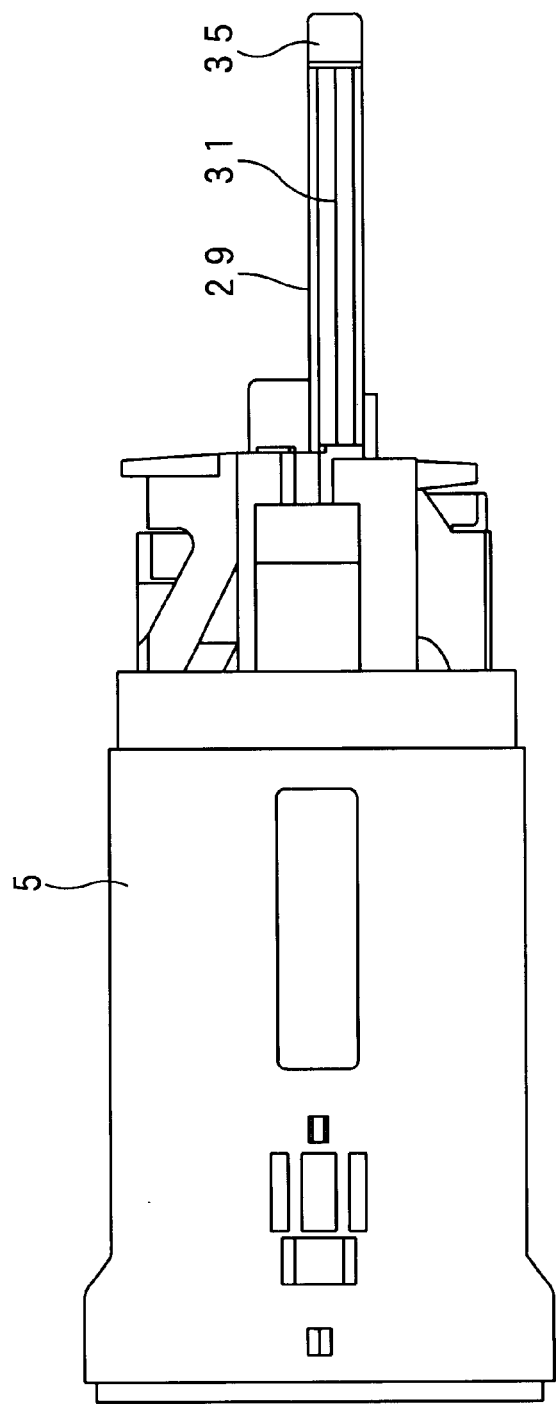
FIG. 2 is a front view of a motor housing of the portable disc grinder according to the embodiment.
Figure 5:
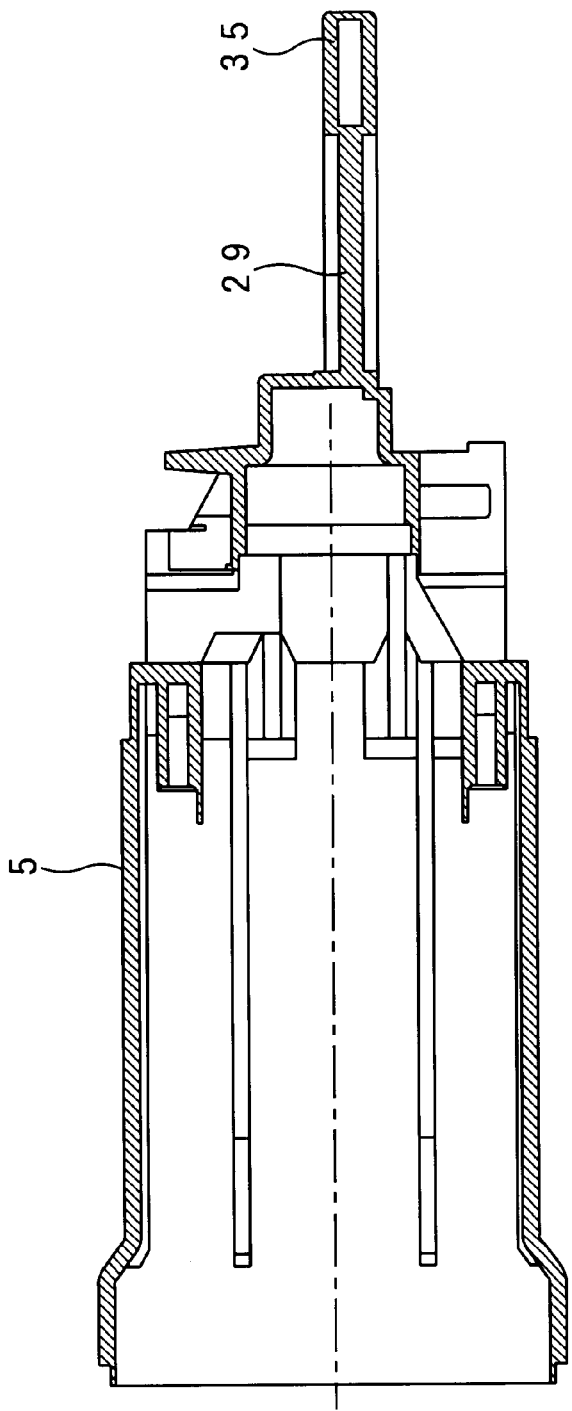
FIG. 5 is a sectional view taken along the line V—V in FIG. 4A.
Figure 6A:
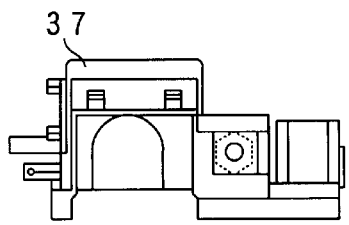
FIGS. 6A, 6B, 6C, 6D, 6E and 6F are a rear view, a left side view, a top plan view, a right side view, a bottom view and a front view respectively, of a switch block adapted for the embodiment.
Figure 6C:
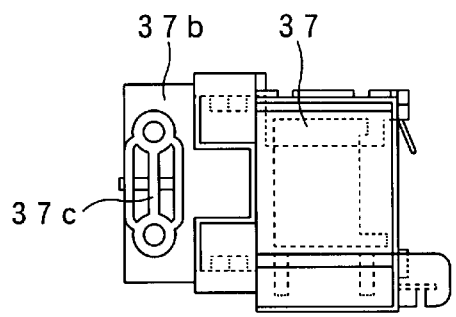
Figure 6B:
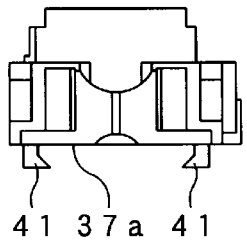
Figure 6F:
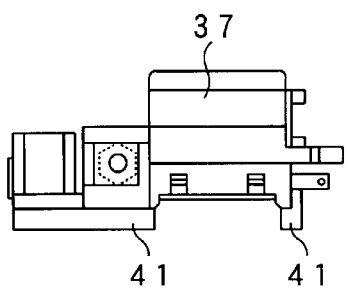
Figure 6D:
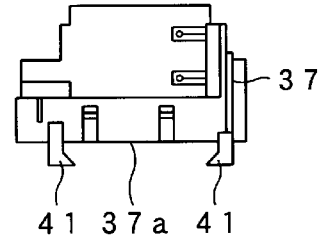
Figure 6E:
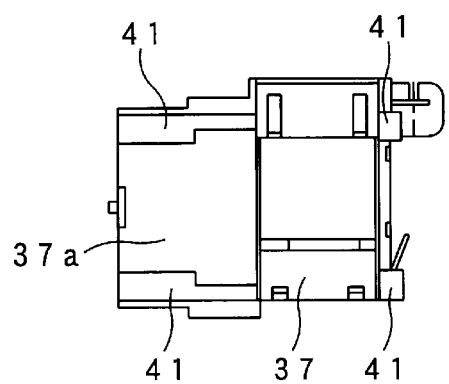
Figure 7A:
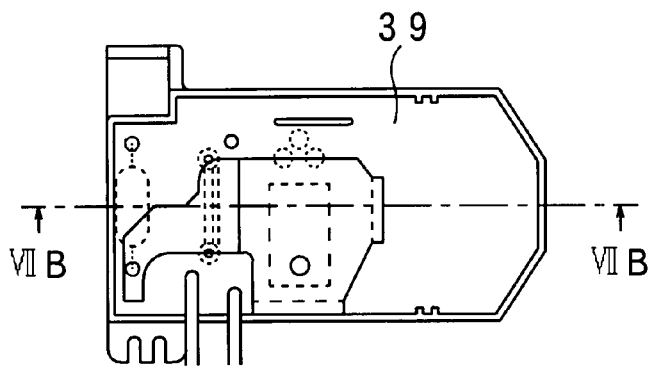
FIGS. 7A, 7B, 7C and 7D are a bottom view, sectional view taken along the line VII B—VII B in FIG. 7A, a top plan view and a right side view respectively, of a controller adapted for the embodiment.
Figure 7B:
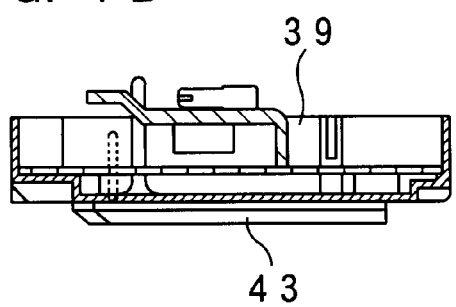
Figure 7D:
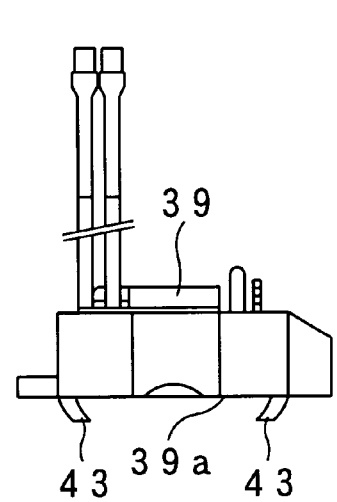
Figure 7C:
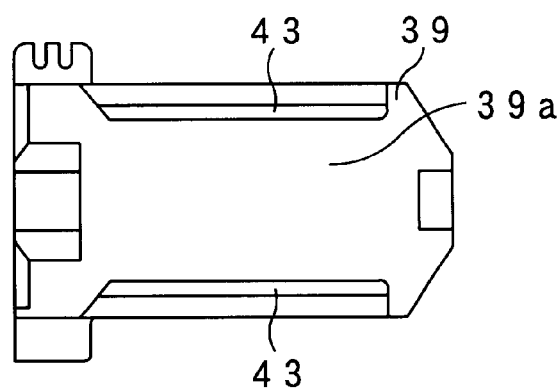

As described in FIG. 1, a portable disc grinder 1 according to an embodiment of the present invention comprises a motor housing 5 which houses a motor 3, a gear housing cover 7 which is attached forward of the motor housing 5, a gear housing complete 9 which is attached in front of the gear housing cover 7, and a rear cover 11 which is attached to the rear of the motor housing 5. Inside the motor housing 5, the motor 3 is housed. Inside the gear housing complete 9, spiral bevel gears 13, 15 are rotatably supported on a motor axis 3a and a spindle 15a, respectively, by ball bearings 17, 19, 21. At the edge of the spindle 15a, a whetstone 27 is tightly pinched between an inner flange 23 and a lock nut 25.

Rearwardly of the motor housing 5, as shown in FIGS. 1–5, a flat mount part 29 extending toward the rear end is integrally molded with the motor housing 5. On this flat mount part 29, as shown in FIG. 4B, V-grooves 31, 31 which are made concave in a V shape on both lateral sides of the mount part 29 are provided. To ensure weight reduction of the flat mount part 29, a plurality of recesses 29a are provided on the top surface and the bottom surface of the flat mount part 29. By providing the recesses 29a, a contact area between the electric equipment 37, 39 and the top and the bottom surface of the flat mount part 29 becomes small, and this reduces sliding friction generated between the electric equipment 37, 39 and the flat mount part 29 upon the removal of the electric equipment 37, 39, and facilitates the removal of the electric equipment 37, 39 from the flat mount part 29. Furthermore, a screw cramp part 35 is provided on the edge of the flat mount part 29 to secure the rear cover 11 with a screw 33 (see FIG. 1).

As shown in FIG. 1, a switch block 37 and a controller 39 are fixed inside the rear cover 11. The switch block 37, as illustrated in FIGS. 6A–6F, is a single unit consisting of a switch part and a condenser, and its bottom surface 37a facing the top surface of the mount part 29 is made flat. On the bottom surface 37a, there are engaging claws 41, 41 which engage V-grooves 31, 31 on the flat mount part 29, and on the top surface 37b, there is provided a cord attachment part 37c to attach a power cord. The controller 39, as illustrated in FIGS. 7A–7D, is also a single unit, and its top surface 39a facing the bottom surface of the mount part 29 is made flat. On the top surface 39a, there are provided engaging claws 43, 43 which engage V-grooves 31, 31 on the flat mount part 29.

Figure 8:
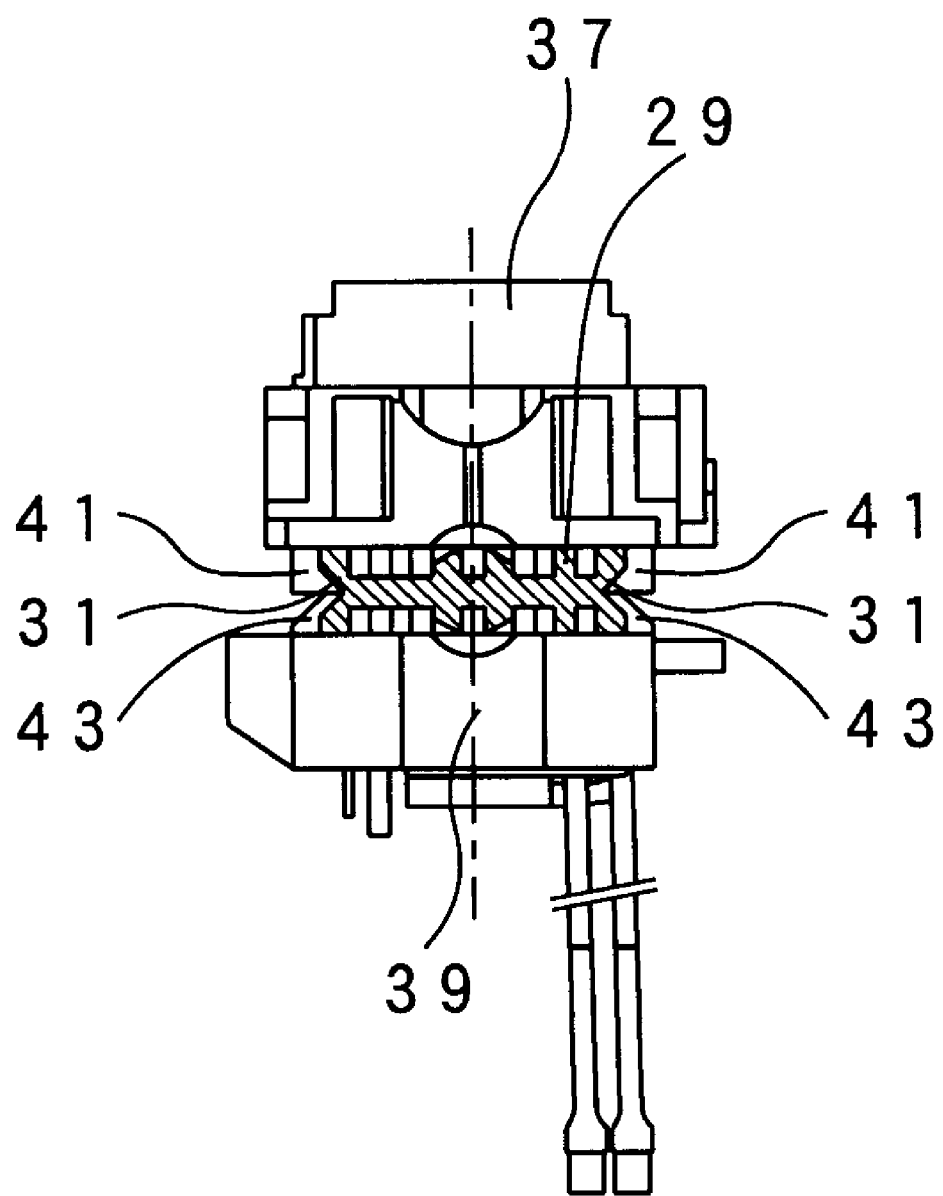
FIG. 8 is a right side view illustrating an attached state of the switch block and the controller according to the embodiment.

Both the switch block 37 and the controller 39 are, as described in FIGS. 1 and 8, fitted and attached to the flat mount part 29, by sliding the units forward from the rear of the mount part 29, simultaneously engaging their engaging claws 41, 43 with the V-grooves 31, 31.

The switch block 37, which is fitted and attached to the mount part 29 extending toward the back of the motor housing 5, is pressed by the rear cover 11 through a cord guard 45 which is composed of an elastic material, and fixed at the predetermined position in the space inside the rear cover 11, as shown in FIG. 1. The controller 39, which is fitted and attached to the mount part 29 extending toward the back of the motor housing 5, is pressed directly by the rear cover 11, and also fixed at the predetermined position in the space inside the rear cover 11, as shown in FIG. 1.

The following description describes the steps for attaching the components to the mount part 29. First, a power cord 44 is passed through a cord opening of the rear cover 11 from the outside of the rear cover 11, and the cord guard 45 is attached to the power cord 44. Then, the forward end of the power cord 44 is screwed on the cord attachment part 37c of the switch block 37, using a cord clamp 47. After wiring a lead of the power cord 44 to the switch block 37, the controller 39 and the switch block 37 are securely fitted and attached to the mount part 29. Then, after leads are wired between the controller 39, the switch block 37 and the motor 3, finally the rear cover 11 is attached to the mount part 29, and the screw 33 is fastened into the screw clamp part 35. The attachment of the components is thus completed.

With the portable disc grinder 1 in the embodiment, it is possible to simplify the shape of the mount part 29 (the motor housing 5) because the attachment of the switch block 37 and the controller 39 can be conducted by a slidable attachment as described above. Therefore, in the embodiment, the shape of the mold of the motor housing 5 can also be simplified. As a result, it becomes possible to miniaturize the mold (i.e. the mount part 29) and to extend the lifetime of the mold with reduction of costs for manufacturing the mold because of the simplicity of the shape of the mold. Furthermore, with the simple structure of the motor housing 5, the attachment of the switch block 37 and the controller 39 can be simply conducted.

Although only one embodiment of the invention has been disclosed and described, it is apparent, without departing from the essential character of the invention, that other embodiments and modification of the invention are possible.

For instance, the invention can be practiced not only in portable disc grinders, but also in other electric tools such as die grinders and orbital sanders. Also, the groove 31 on the mount part 29 can be made in different shapes such as a dovetail groove and may be provided on only one lateral side. Furthermore, the recesses 29a on the top surface and the bottom surface of the mount part 29 need not to be provided.

What is claimed is:

1. An attachment structure for electric equipment of a portable electric tool comprising:

a mount part in a rear of a motor housing and extending toward a rear end of the electric tool;

a concave groove mounted on at least one side of the mount part for engagement with desired electric equipment; and unitized electric equipment, for attachment to the electric tool, provided with an engaging claw for engaging with the concave groove on the mount part;

wherein the electric equipment is attached to the mount part by sliding itself forward from behind and engaging the engaging claw with the concave groove; and the electric equipment attached to the mount part is fixed by being pressed against the motor housing by a rear cover which is attached to the electric tool from the rear of the motor housing.

2. The attachment structure according to claim 1, wherein:

the mount part is formed as a flat board with flattened top and bottom surfaces, with the concave groove provided on at least one lateral side of the mount part;

the electric equipment is unitized with one of a bottom surface and a top surface facing the surface of the flattened mount part; and the engaging claw is provided on one of the bottom surface and the top surface of the electric equipment.

3. The attachment structure according to claim 1, further comprising a plurality of recesses formed in a top surface and a bottom surface of the mount part and extending in an axial direction.

* * * * *